United States Patent
Sen et al.

(10) Patent No.: US 10,951,492 B2
(45) Date of Patent: Mar. 16, 2021

(54) SYSTEM AND A METHOD FOR AUTOMATIC CONVERSION OF MONOLITHIC SERVICES TO MICRO-SERVICES

(71) Applicant: Cognizant Technology Solutions India Pvt. Ltd., Chennai (IN)

(72) Inventors: Tapodhan Sen, Kolkata (IN); Saroj Pradhan, Kolkata (IN); Swastika Basu, Kolkata (IN); Arunava Pal, Kolkata (IN); Sandip Bandyopadhyay, Hooghly (IN)

(73) Assignee: COGNIZANT TECHNOLOGY SOLUTIONS INDIA PVT. LTD., Chennai (IN)

( * ) Notice: Subject to any disclaimer, the term of this patent is extended or adjusted under 35 U.S.C. 154(b) by 0 days.

(21) Appl. No.: 16/569,887

(22) Filed: Sep. 13, 2019

(65) Prior Publication Data
US 2021/0029001 A1    Jan. 28, 2021

(30) Foreign Application Priority Data
Jul. 26, 2019   (IN) .............................. 201941030313

(51) Int. Cl.
*G06F 15/16* (2006.01)
*G06F 9/54* (2006.01)
(Continued)

(52) U.S. Cl.
CPC .......... *H04L 41/5041* (2013.01); *G06F 8/433* (2013.01); *G06F 8/72* (2013.01);
(Continued)

(58) Field of Classification Search
CPC .................................................. H04L 41/5041
(Continued)

(56) References Cited

U.S. PATENT DOCUMENTS

| | | | |
|---|---|---|---|
| 10,579,370 B2 * | 3/2020 | Gupta | ........................ G06F 8/20 |
| 2016/0112475 A1 * | 4/2016 | Lawson | .................. H04L 67/02 |
| | | | 709/204 |

(Continued)

OTHER PUBLICATIONS

Towards a Technique for Extracting Microservices from Monolithic Enterprise Systems, Alessandra Levcovitz, Ricardo Terra, Marco Tulio Valente (Year: 2016).*

(Continued)

*Primary Examiner* — Hamza N Algibhah
(74) *Attorney, Agent, or Firm* — Cantor Colburn LLP

(57) ABSTRACT

A system and method for conversion of monolithic services to micro-services is provided. One or more features related to service associated with domain implemented by monolithic service source code are identified. Features are identified for creating first feature set. One or more features are determined related to dependencies and cross-dependencies amongst one or more service functions associated with service, implemented by monolithic service source code, and between service functions and entities associated with domain expressed in the monolithic service source code. One or more features related to dependencies and cross-dependencies are determined for creating second feature set. Relationship between features present in first feature set and second feature set is determined. The relationship is representative of similarity of the features present in first feature set and second feature set. One or more micro-services are created based on similarity between features present in first feature set and second feature set.

18 Claims, 4 Drawing Sheets

(51) Int. Cl.
  *H04L 29/06* (2006.01)
  *H04L 12/24* (2006.01)
  *G06F 9/50* (2006.01)
  *G06F 8/41* (2018.01)
  *G06F 8/72* (2018.01)
  *G06F 8/76* (2018.01)
  *G06F 9/445* (2018.01)

(52) U.S. Cl.
  CPC ............ *G06F 8/76* (2013.01); *G06F 9/44505* (2013.01); *G06F 9/5077* (2013.01); *H04L 41/0886* (2013.01)

(58) Field of Classification Search
  USPC .......................................................... 709/223
  See application file for complete search history.

(56) References Cited

U.S. PATENT DOCUMENTS

| | | | |
|---|---|---|---|
| 2017/0046146 A1* | 2/2017 | Jamjoom | G06F 8/71 |
| 2017/0353528 A1* | 12/2017 | Wei | H04L 67/10 |
| 2018/0248771 A1* | 8/2018 | Cote | H04L 41/5025 |
| 2018/0287876 A1* | 10/2018 | Strobel | H04L 41/12 |
| 2018/0365008 A1* | 12/2018 | Chandramouli | G06F 8/65 |
| 2019/0065177 A1* | 2/2019 | Khoongumjorn | G06F 9/4488 |
| 2019/0102717 A1* | 4/2019 | Wu | G06Q 10/06375 |
| 2019/0108067 A1* | 4/2019 | Ishikawa | H04L 41/50 |
| 2019/0171433 A1* | 6/2019 | Groseclose | G06F 8/76 |
| 2019/0220289 A1* | 7/2019 | Driesen | G06F 9/44505 |
| 2019/0250912 A1* | 8/2019 | Gavisiddappa Kodigenahalli | G06F 8/20 |
| 2019/0334789 A1* | 10/2019 | Roche | H04L 67/2819 |
| 2020/0019388 A1* | 1/2020 | Jaeger | G06F 9/5055 |
| 2020/0159557 A1* | 5/2020 | Pasupathy | G06F 9/45558 |
| 2020/0226002 A1* | 7/2020 | MacLeod | G06F 16/2379 |
| 2020/0285451 A1* | 9/2020 | Agarwal | G06F 8/36 |

OTHER PUBLICATIONS

G. Mazlami, J. Cito and P. Leitner, "Extraction of Microservices from Monolithic Software Architectures," 2017 IEEE International Conference on Web Services (ICWS), Honolulu, HI, 2017, pp. 524-531, doi: 10.1109/ICWS.2017.61. (Year: 2017).*

Muhammad Abdullah, "Unsupervised Learning Approach for Web Application Auto-Decomposition into Microservices", 2019, https://www.researchgate.net/publication/331198800_Unsupervised_Learning_Approach_for_Web_Application_Auto-Decomposition_into_Microservices.

* cited by examiner

SYSTEM AND A METHOD FOR AUTOMATIC CONVERSION OF MONOLITHIC SERVICES TO MICRO-SERVICES

CROSS REFERENCE TO RELATED APPLICATION

This application is related to and claims the benefit of Indian Patent Application Number 201941030313 filed on Jul. 26, 2019, the contents of which are herein incorporated by reference in their entirety.

FIELD OF THE INVENTION

The present invention relates generally to the field of computer services and applications. More particularly, the present invention relates to a system and a method for automatic conversion of monolithic services to micro-services without any human intervention.

BACKGROUND OF THE INVENTION

Deployment of micro-service application architecture as a development framework for services and information systems have recently gained a lot of popularity by various entities and organizations. Typically, micro-services architecture is formed by transforming a large monolithic application as a collection of loosely coupled services. Micro-services are generally preferred because of their small size, easy maintenance and efficient utilization as compared to large size monolithic services. Micro-services are further capable of providing business capabilities.

Conventionally, conversion or transformation of monolithic services architecture to micro-services architecture is a manual process in which a software developer or architect has to address the difficult problem of refactoring functionalities between services. The software architects are not able to efficiently assess the functionalities of monolithic services for conversion to micro-services. Further, the software architect may come across one or more challenges in the process of conversion or transformation of monolithic services to micro-services. The challenges may include, but are not limited to, monolithic services getting bulkier with period of time as they require cycles of bug fixes, enhancements and additions being made to monolithic services, which makes them complex for processing. Further, documentation related to monolithic services and/or monolithic services may eventually become outdated and may not represent the current features and the state of code or the like. These challenges therefore complicate the conversion process of monolithic services to micro-services. Furthermore, during the difficult process of conversion of monolithic services to micro-services architecture, software architects are not able to effectively identify correct and precise domain boundaries for micro-services due to convoluted structure and functionalities of monolithic services.

In light of the aforementioned drawbacks, there is a need for a system and a method which automatically optimizes conversion of monolithic services to micro-services. Further, there is a need for a system and a method which is capable of correctly determining micro-service domain boundaries for conversion of monolithic services to micro-services. Furthermore, there is a need for a system and a method which provides effective and efficient conversion of monolithic services to micro-services without any human intervention.

SUMMARY OF THE INVENTION

In various embodiments of the present invention, a method for conversion of monolithic services to micro-services is provided. The method is implemented by a processor executing instructions stored in a memory. The method comprises identifying one or more features related to a service associated with a domain implemented by a monolithic service source code. The features are identified for creating a first feature set. The method further comprises determining one or more features related to dependencies and cross-dependencies amongst one or more service functions associated with the service, implemented by the monolithic service source code, and between the service functions and entities associated with the domain expressed in the monolithic service source code. The one or more features related to dependencies and cross-dependencies are determined for creating a second feature set. The method further comprises determining a relationship between the features present in the first feature set and the features present in the second feature set. The relationship is representative of similarity of the features present in the first feature set and the second feature set. Finally, the method comprises creating one or more micro-services based on the similarity between the features present in the first feature set and the second feature set.

In various embodiments of the present invention, a system for conversion of monolithic services to micro-services is provided. The system comprises a memory storing program instructions, a processor configured to execute program instructions stored in the memory and a service conversion engine executed by the processor. The system is configured to identify one or more features related to a service associated with a domain implemented by a monolithic service source code. The features are identified for creating a first feature set. Further, the system is configured to determine one or more features related to dependencies and cross-dependencies amongst one or more service functions associated with the service, implemented by the monolithic service source code, and between the service functions and entities associated with the domain expressed in the monolithic service source code. The one or more features related to dependencies and cross-dependencies are determined for creating a second feature set. Further, the system is configured to determine a relationship between the features present in the first feature set and the features present in the second feature set. The relationship is representative of similarity of the features present in the first feature set and the second feature set. Finally, the system is configured to create one or more micro-services based on the similarity between the features present in the first feature set and the second feature set.

In various embodiments of the present invention, a computer program product is provided. The computer program product comprises a non-transitory computer-readable medium having computer program code store thereon, the computer-readable program code comprising instructions that, when executed by a processor, caused the processor to identify one or more features related to a service associated with a domain implemented by a monolithic service source code. The features are identified for creating a first feature set. Further, one or more features related to dependencies and cross-dependencies amongst one or more service functions associated with the service, implemented by the monolithic service source code, and between the service functions and entities associated with the domain expressed in the monolithic service source code is determined. The one or more features related to dependencies and cross-dependencies are determined for creating a second feature set. Further, relationship between the features present in the first feature set and the features present in the second feature set is determined. The relationship is representative of similarity of the features present in the first feature set and the second feature set. Finally, one or more micro-services are created based on the similarity between the one or more features present in the first feature set and the second feature set.

BRIEF DESCRIPTION OF THE ACCOMPANYING DRAWINGS

The present invention is described by way of embodiments illustrated in the accompanying drawings wherein.

DETAILED DESCRIPTION OF THE INVENTION

The present invention discloses a system and a method for automatic conversion of monolithic services to micro-services. The present invention provides for a self-optimizing intelligent system for efficient conversion of monolithic services to micro-services. Further, the present invention provides for a system and a method which utilizes actual source code (and not meta-data) of the monolithic service for conversion of monolithic services to micro-services. Further, the present invention provides for a system and a method for automatic detection of domain boundaries for micro-services at the time of conversion from monolithic services. Furthermore, the present invention provides for a system and a method for assisting software architects for making efficient decisions with regard to feature selection during conversion of monolithic services to micro-services without any human intervention.

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the spirit and scope of the invention. The terminology and phraseology used herein is for the purpose of describing exemplary embodiments and should not be considered limiting. Thus, the present invention is to be accorded the widest scope encompassing numerous alternatives, modifications and equivalents consistent with the principles and features disclosed herein. For purposes of clarity, details relating to technical material that is known in the technical fields related to the invention have been briefly described or omitted so as not to unnecessarily obscure the present invention.

The present invention would now be discussed in context of embodiments as illustrated in the accompanying drawings.

Figure 1:
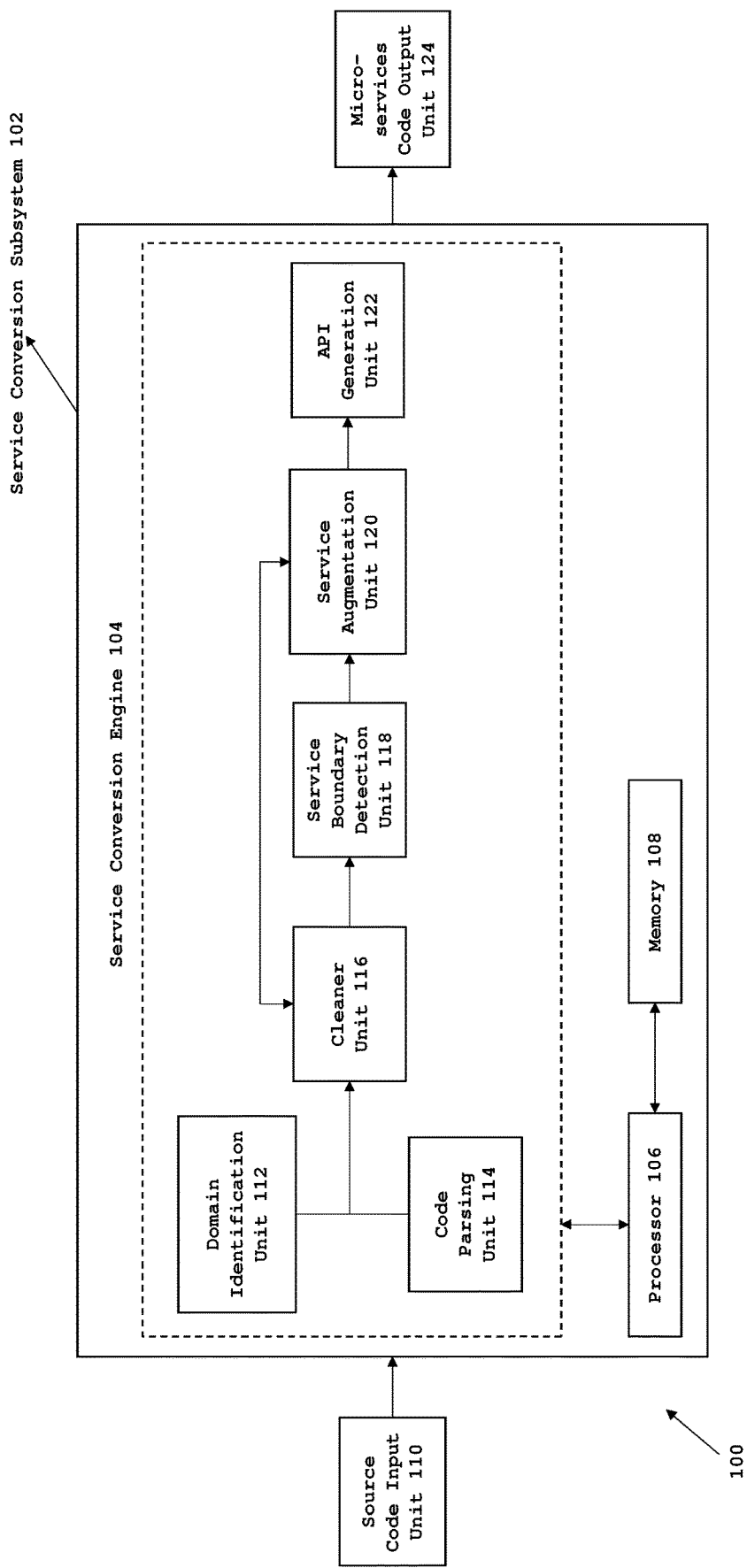
FIG. 1 is a detailed block diagram of a system for automatic conversion of monolithic services to micro-services, in accordance with various embodiments of the present invention.

FIG. 1 is a detailed block diagram of a service conversion system 100 for automatic conversion of monolithic services to micro-services, in accordance with various embodiments of the present invention. Referring to FIG. 1, in an embodiment of the present invention, the system 100 comprises a service conversion subsystem 102, a source code input unit 110 and a micro-services output unit 124. The service conversion subsystem 102 interfaces with the source code input unit 110 at one end and the micro-services code output unit 124 on the other end. The source code input unit 110 and the micro-services code output unit 124 are connected to the subsystem 102 via a communication channel (not shown). The communication channel (not shown) may include, but is not limited to, a physical transmission medium, such as, a wire, or a logical connection over a multiplexed medium, such as, a radio channel in telecommunications and computer networking. The examples of radio channel in telecommunications and computer networking may include, but are not limited to, a local area network (LAN), a metropolitan area network (MAN) and a wide area network (WAN).

The solution conversion subsystem 102 is configured with built-in-intelligent mechanism for analyzing and assessing the monolithic source code for automatic conversion to micro-services source code. The service conversion subsystem 102 is a self-optimizing and self-learning system which is configured to assist software architects to make right and efficient decisions for conversion of monolithic services to micro-services architecture. The subsystem 102 utilizes one or more cognitive techniques such as, but not limited to, artificial intelligence, machine learning or the like for analyzing and assessing the monolithic services for conversion to micro-services.

In an embodiment of the present invention, the service conversion subsystem 102 comprises a service conversion engine 104, a processor 106 and a memory 108. In various embodiments of the present invention, the service conversion engine 104 has multiple units which work in conjunction with each other for automatic conversion of monolithic services to micro-services. The various units of the service conversion engine 104 are operated via the processor 106 specifically programmed to execute instructions stored in the memory 108 for executing respective functionalities of the units of the engine 104 in accordance with various embodiments of the present invention.

In another embodiment of the present invention, the subsystem 102 may be implemented in a cloud computing architecture in which data, applications, services, and other resources are stored and delivered through shared datacenters. In an exemplary embodiment of the present invention, the functionalities of the subsystem 102 are delivered to a user as software as a service (SaaS) over a communication network.

In another embodiment of the present invention, the subsystem 102 may be implemented as a client-server architecture. In this embodiment of the present invention, a client terminal accesses a server hosting the subsystem 102 over a communication network. The client terminals may include but are not limited to a smart phone, a computer, a tablet, microcomputer or any other wired or wireless terminal. The server may be a centralized or a decentralized server.

In an embodiment of the present invention, the solution conversion subsystem 102 is configured to receive a monolithic source code via the source code input unit 110. The source code input unit 110 may comprise a source code control system such as, but not limited to, Git, concurrent vision system (CVS), Apache® subversion (SVN), file repository, standard file system or the like. In an exemplary embodiment of the present invention, the solution conversion subsystem 102 is configured to process the actual source code associated with the monolithic services and not the meta-data associated with the monolithic services. The monolithic service source code relates to a single tiered software application source code which fabricates various components of the service in a combined manner and using which the software application is build. The meta-data related to monolithic services may include, but is not limited to, change history, change logs, developer associations, tags, comments, user names or the like.

In an embodiment of the present invention, the solution conversion engine 104 comprises a domain identification unit 112, a code parsing unit 114, a cleaner unit 116, a service boundary detection unit 118, a service augmentation unit 120, and an application programming interface (API) generation unit 122.

In operation, in an embodiment of the present invention, the domain identification unit 112 of the service conversion engine 104 is configured to receive the monolithic service source code from the source code input unit 110. The domain identification unit 112 is configured to apply one or more artificial intelligence techniques such as, but is not limited to, natural language processing (NLP) or the like to process and analyze the received monolithic service source code for determining the domain of the service in which the monolithic service source code is implemented. The domain of the service related to the source code is representative of a field in which the monolithic service application is implemented and operated. For example, the domain of the service in which the monolithic service source code is implemented and operated may include, but is not limited to, banking service, retail service, e-commerce, online content streaming, social media, online event booking, catalog service, shipping service, payment service, order service or the like. Further, the source code of the monolithic service may be written in a computer programming language such as, but not limited to, C, C#, C++, Java, python or the like.

The domain identification unit 112 is configured to apply NLP technique on the monolithic service source code for identification, detection and extraction of features related to a service associated with a domain present in the monolithic service source code. For example, if the monolithic service is of banking domain, the domain related features present in the monolithic service source code may include, but are not limited to, account features, payment features, fund transfer features or the like. The domain identification unit 112 therefore analyzes and processes the monolithic service source code for semantically identifying the domain of the service based on a high level perception of the semantics. The domain related features present in the monolithic service source code may relate to domain identifiers and domain expressions present in monolithic service source code such as, but not limited to, variable names, method names, correlating abbreviations that may be utilized in a source code to a standard domain dictionary for a given industry or the like. For example, the correlating abbreviations may include, but not limited to, for banking—BIAN, for travel—OTA etc. Therefore, if the application is utilized for banking industry, the words "svacnt", "savact", "sbact" etc. in the source code can be identified as "savings account". The domain identifiers and domain expressions are utilized when the detection of database entities associated with the source code is not explicitly possible or a call graph cannot be determined from the monolithic source code. The domain features extracted may further be utilized for determining the level of association between the one or more services executed by the monolithic services architecture utilizing the monolithic service source code. Further, the domain identification unit 112 is configured to combine extracted domain features for creating a first feature set comprising the related and similar domain features identified from the monolithic service source code.

In an embodiment of the present invention, the code parsing unit 114 is configured to receive the monolithic service source code from the source code input unit 110 provided to the service conversion subsystem 102. The code parsing unit 114 is configured to parse the received monolithic service source code utilizing a code parser. The code parser utilized may include, but is not limited to, a compiler or the like. The code parsing unit 114 is configured to parse the monolithic source code for extracting source code syntax and forming an abstract syntax tree (AST). The source code syntax may relate to the manner in which a source code may be written. The AST formed is representative of the syntax of the source code in a hierarchical manner. The AST formed may further comprise nodes representing objects such that each specific node provides specific information regarding the object it represents and its interaction with other objects. The objects represented by the nodes in the AST may relate to operators and characters that may occur in the monolithic service source code. A call graph from the extracted AST is utilized by the code parsing unit 114 for determining manner of interaction of service functions with domain entities that implement specific functionalities related to the service of that particular domain. For example, in an application relating to online shopping, a service functionality such as, but not limited to, "check out" may involve read actions on domain entities such as, but not limited to, "customer", "product", "shopping cart" and alter actions on domain entities such as, but not limited to "sales order", "line item", "invoice" etc. The formed AST is further traversed by the code parsing unit 114 for determining one or more features related to dependency and cross-dependency amongst the one or more service functions which are implemented by monolithic service source code and between the service functions and the one or more entities associated with the domain of the service which are expressed in the monolithic service source code. The dependencies and cross-dependencies of the service functions on the domain entities is representative of coupling of the service functions to the domain entities associated with the monolithic service source code. The code parsing unit 114 is configured to create a second feature set comprising similar features is representative of coupling of the service functions to the domain entities determined based on dependencies and cross-dependencies of the service functions on the domain entities.

In an embodiment of the present invention, output of the domain identification unit 112 comprising the first feature set and output of the code parsing unit 114 comprising the second feature set is combined by the engine 104 and is subsequently transmitted to the cleaner unit 116. For instance, if output of the domain identification unit 112 comprises first feature set with 'm' features and output of the code parsing unit 114 comprises second feature set with 'n' features then the combined output may comprise 'm+n' features. For example, if the domain identification unit 112 extracts two feature from the monolithic source code such as, but not limited to, retail banking, account management to form a first feature set and the code parsing unit 114 parses the monolithic source code and extracts three feature from the monolithic source code such as, but not limited to, savings account, value added services, debit card, then the engine 104 combines the first feature set and second feature set to form combined feature sets comprising five features such as, retail banking, account management, savings account, value added services, debit card. The cleaner unit 116 is configured to process the combined first feature set and the second feature set for subsequent identification of one or more redundant features that may be present in the first feature set and the second feature set. The redundant features (also referred to as outliers) may include, but are not limited to, monolithic service features present in the monolithic service source code that are not required for conversion to micro-services architecture. The cleaner unit 116 is configured to subsequently remove the identified redundant features from the combined feature sets. For instance, if the combined feature sets comprise 20 monolithic services features and out of the said 20 features only 15 features are to be utilized for conversion to the micro-services, the remaining 5 redundant features are therefore subsequently removed by the cleaner unit 116 from the combined feature sets. For example, in a monolithic service comprising domain entities (E) as {E: E1, E2, E3, E4, E5, E6, E7, E8, E9}, monolithic service source code changes may occur over a period of time. The current version of the monolith does not have active services that use entities E5 and E7, thereby marking the features representing E5 and E7 as redundant. Therefore, such redundant features are subsequently removed by the cleaner unit 116. The cleaner unit 116 is further configured to store the redundant features in a redundant feature storage unit (not shown).

In an embodiment of the present invention, the service boundary detection unit 118 is configured to receive the cleaned combined feature sets from the cleaner unit 116. The service boundary detection unit 118 utilizes one or more cognitive techniques such as, but not limited to, artificial intelligence techniques to process and analyze the feature sets received from the cleaner unit 116 for determining relation between various monolithic service features present in the combined first features set and the second feature set. Artificial intelligence techniques utilized may include, but are not limited to, unsupervised clustering algorithms, such as, density based spatial clustering of application with noise (DBSCAN) algorithm or the like. The relation between various monolithic service features is determined in order to cluster the most similar features for creating a particular micro-service. In various embodiments of the present invention, multiple micro-services may be created.

In an exemplary embodiment of the present invention, the service boundary detection unit 118 is configured to process each feature present in the first and second feature sets as one or more data points in an n-dimensional space such as, but not limited to, Euclidian space or the like. Further, each feature present in the feature sets is representative of one or more components of the monolithic source code. For example, the monolithic source code implemented in banking services may have components such as account types, transaction, payment modes, investment or the like. The service boundary detection unit 118 is further configured to automatically create multi-dimensional density based clusters of the similar features point based on the similarity of one or more features with respect to other feature, utilizing DBSCAN algorithm. The density based clusters of similar features are formed by determining associations between various features points. The association between the feature points represents one or more similar features points that may lie in close proximity with respect to each other. For instance, in a three dimensional Euclidian space if x, y and z axes represent services X, Y and Z respectively, such that x=1, y=1 and z=1, it implies alteration of a feature by services X, Y and Z. Then, from the monolithic source code, if the features F1, F2, F3 and F4 are represented in the reference space as (0,1,0), (1,1,0), (1,0,0) and (0,0,1) based on alteration by services X, Y and Z, then similarity of the features F1, F2, F3 and F4 are assessed from their relative position in that reference space. In an exemplary embodiment of the present invention, the DBSCAN algorithm applied by the service boundary detection unit 118 for clustering the similar feature points determines the density reachability of one point with respect to other point for forming clusters of similar feature points. For example, a point 'p' is said to be density reachable from a point 'q' if point 'p' is within E distance from point 'q' and point 'q' has sufficient number of points in its neighbors which are within distance E. Further, the service boundary detection unit 118 determines density connectivity between feature points in furtherance to determining density reachability in order to form unsupervised clusters of similar feature points. For example, suppose point 'p' and 'q' are considered to be density connected, it is determined if a point 'r' has sufficient number of points in its neighbor and both the points 'p' and 'q' are within E distance of the point 'r'. Further, it is determined if a link exists between points in a chaining manner. For instance, if a point 'q' is a neighbor of 'r', 'r' is a neighbor of 's', 's' is a neighbor of point 't' which is a neighbor of point 'p' implies that 'q' is a neighbor of 'p'. Further, the clusters formed are of arbitrary shapes. In an exemplary embodiment of the present invention, the service boundary detection unit 118 therefore detects and produces separate bounded context features for similar feature density clusters formed comprising similar feature services. For instance, in a three dimensional Euclidian space if x, y and z axes represents features X, Y and Z where x=1, y=1 and z=1 then it implies that a service function utilizes these features. Further, from the monolithic source code if service entities E1, E2, E3 and E4 are found to be (0,1,0), (1,1,0), (1,0,0) and (0,0,1) based on usage of features X, Y and Z represented in that reference space, then, from their relative position in the reference space it may be inferred that the service entities E1, E2 and E3 belong to the same bounded context. The bounded context features are representative of stable boundaries between different services, having respective similar features, implemented by the monolithic service source code. The stable boundary between different services implies that the services belonging to the particular bounded context features does not comprise conflicting features, with respect to other service features, present in the bounded context features.

In an embodiment of the present invention, the service augmentation unit 120 is configured to receive the detected and produced bounded context features from the service boundary detection unit 118. The service augmentation unit 120 process the bounded context features for identifying and classifying the services present in the bounded context features into atomic micro-services and composite micro-services. The service augmentation unit 120 is configured to first identify atomic micro-services from the bounded context services. The atomic micro-services are services relating to domain entity service operations, for example, create operation, read operation, update operation, delete operation (CRUD) or the like. Further, for a given bounded context, entities belonging to that bounded context are selected for atomic micro-services. The service augmentation unit 120 communicates with the cleaner unit 116 for fetching the stored redundant features from the redundant feature storage unit (not shown) for re-introducing the redundant features. The re-introduction of redundant features provides analysis of all the domain resources for effectively identifying the atomic micro-services. Further, after the identification of atomic micro-services, the service augmentation unit 120 is configured to identify the composite micro-services from the bounded context services. Therefore, once the atomic services are detected, the monolithic functionalities are revisited to check if any monolithic functionality involves interaction with domain entities belonging to multiple bounded contexts. Subsequent to such detection, functionality is marked as a composite service. The composite micro-services are services that may combine or aggregate multiple external CRUD operational functions and further appends business rules.

In an embodiment of the present invention, the API generation unit 122 is configured to receive the identified atomic micro-services and composite micro-services from the service augmentation unit 120. The API generation unit 122 is configured to generate specifications of the atomic micro-services and composite micro-services utilizing open source application programming interface (API) specifications for providing interaction and communication of one micro-service with the other micro-service. Therefore, subsequent to the atomic and composite services identification and formation, corresponding API is generated conforming to OpenAPI Specification from the entity participation of those functionalities. For example, for an atomic service, the create, read, update and delete actions get mapped to HTTP methods POST, GET, PUT and DELETE respectively. Further, for composite services the HTTP method is based on the actions performed by a composite API on the domain entities. If no domain entity gets altered in such interaction then HTTP GET is used, otherwise, POST is used in case of mixed actions.

In an embodiment of the present invention, the micro-services code output unit 124 is configured to receive the created atomic and composite micro-services along with the API specifications from the service conversion subsystem 102 and subsequently provided to the software architect via a graphical user interface (GUI) for assisting the software architect for determining the efficient domain boundaries or bounded context of services for conversion of monolithic services to micro-services.

Advantageously, in accordance with various embodiments of the present invention, the subsystem 102 is configured with built-in intelligence mechanism which is capable of automatically processing the monolithic services for conversion to micro-services by automatically detecting the domain boundaries of applications and entities of the services. The subsystem 102 is configured to utilize the actual monolithic service source code and not the meta-data related to the source code for processing the monolithic source code for conversion to micro-services. The subsystem 102 therefore assists software architects in determining efficient micro-services architecture detection with regard to service domain boundaries, which are difficult to determine manually. The subsystem 102 therefore provides for faster and efficient conversion of monolithic services to micro-services without any human intervention.

Figure 2:
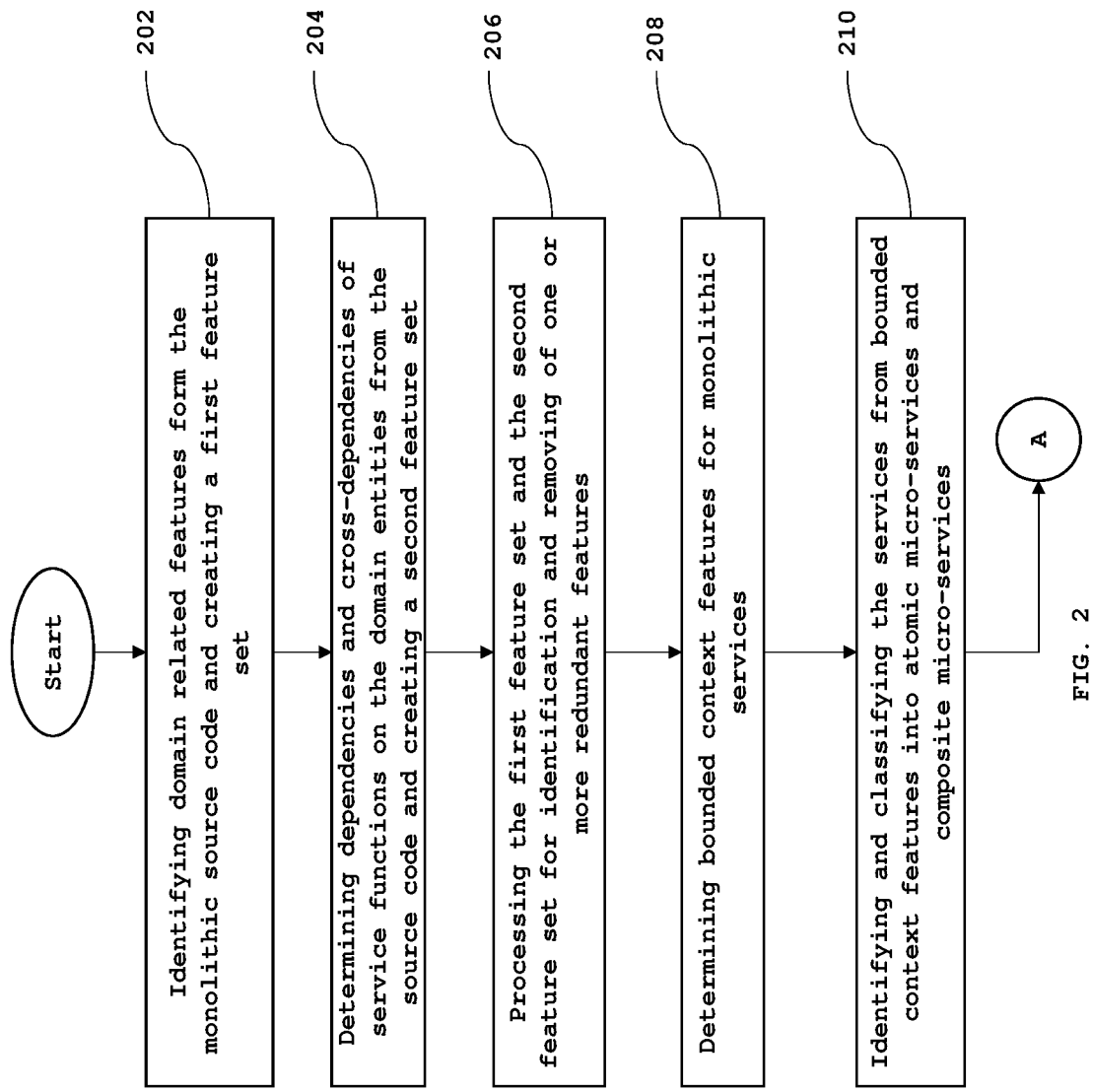
FIG. 2 is a flowchart illustrating a method for automatic conversion of monolithic services to micro-services, in accordance with various embodiments of the present invention.
Figure 2:
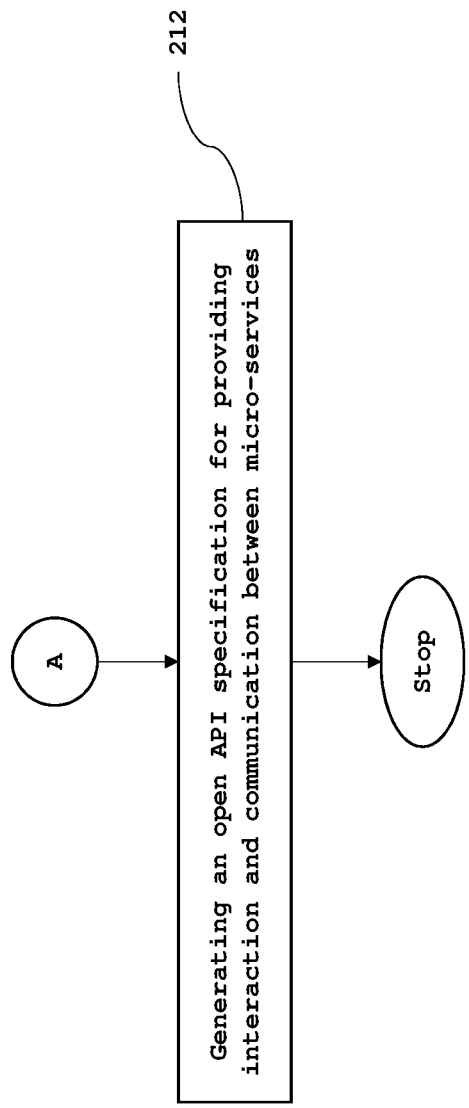

FIG. 2 is a flowchart illustrating a method for automatic conversion of monolithic services to micro-services, in accordance with various embodiments of the present invention.

At step 202, domain related features are identified from the monolithic source code and a first feature set is created. In operation, in an embodiment of the present invention, one or more artificial intelligence techniques such as, but is not limited to, natural language processing (NLP) or the like are applied to process and analyze the monolithic service source code for determining the domain of the service in which the monolithic service source code implemented. The domain of the service related to the source code is representative of a field in which the monolithic service application is implemented and operated. For example, the domain of the service in which the monolithic service source code is implemented and operated may include, but is not limited to, banking service, retail service, e-commerce, online content streaming, social media, online event booking, catalog service, shipping service, payment service, order service or the like. Further, the source code of the monolithic service may be written in a computer programming language such as, but not limited to, C, C#, C++, Java, python or the like.

The NLP technique is applied on the monolithic service source code for identification, detection and extraction of features related to a service associated with a domain present in the monolithic service source code. For example, if the monolithic service is of banking domain, the domain related features present in the monolithic service source code may include, but are not limited to, account features, payment features, fund transfer features or the like. Therefore, the monolithic service source code is analyzed and processed for semantically identifying the domain of the service based on a high level perception of the semantics. The domain related features present in the monolithic service source code may relate to domain identifiers and domain expressions present in monolithic service source code such as, but not limited to, variable names, method names, correlating abbreviations that may be utilized in a source code to a standard domain dictionary for a given industry or the like. For example, the correlating abbreviations may include, but not limited to, for banking—BIAN, for travel—OTA etc. Therefore, if the application is utilized for banking industry, the words "svacnt", "savact", "sbact" etc. in the source code can be identified as "savings account". The domain features extracted may further be utilized for determining the level of association between the one or more services executed by the monolithic services architecture utilizing the monolithic service source code. Further, the domain features are combined for creating a first feature set comprising the related and similar domain features identified from the monolithic service source code.

At step 204, dependencies and cross-dependencies of service functions on the domain entities are determined from the source code and a second feature set is created. In an embodiment of the present invention, the monolithic service source code is parsed utilizing a code parser. The code parser utilized may include, but is not limited to, a compiler or the like. The monolithic source code is parsed for extracting source code syntax and an abstract syntax tree (AST) is formed. The source code syntax may relate to the manner in which a source code may be written. The AST formed is representative of the syntax of the source code in a hierarchical manner. The AST formed may further comprise nodes representing objects such that each specific node provides specific information regarding the object it represents and its interaction with other objects. The objects represented by the nodes in the AST may relate to operators and characters that may occur in the monolithic service source code. A call graph from the extracted AST is utilized for determining manner of interaction of service functions with domain entities that implement specific functionalities related to the service of that particular domain. For example, in an application relating to online shopping, a service functionality such as, but not limited to, "check out" may involve read actions on domain entities such as, but not limited to, "customer", "product", "shopping cart" and alter actions on domain entities such as, but not limited to "sales order", "line item", "invoice" etc. The formed AST is further traversed for determining one or more features related to dependency and cross-dependency amongst the one or more service functions which are implemented by monolithic service source code and between the service functions and one or more entities associated with the domain of the service which are expressed in the monolithic service source code. The dependencies and cross-dependencies of the service functions on the domain entities is representative of coupling of the service functions to the domain entities associated with the monolithic service source code. Further, a second feature set is created comprising similar features is representative of coupling of the service functions to the domain entities determined based on dependencies and cross-dependencies of the service functions on the domain entities.

At step 206, the first feature set and the second feature set is processed for identification and removing of one or more redundant features. In an embodiment of the present invention, the first feature set and the second feature set is combined and subsequently cleaned. For instance, if output of the domain identification unit 112 comprises 'm' features and output of the code parsing unit 114 comprises 'n' features then the combined output may comprise 'm+n' features. For example, if two feature are extracted from the monolithic source code such as, but not limited to, retail banking, account management to form a first feature set and further separately the monolithic source code is parsed and three feature are extracted from the monolithic source code such as, but not limited to, savings account, value added services, debit card, then the first feature set and second feature set are combined to form combined feature sets comprising five features such as, retail banking, account management, savings account, value added services, debit card. The combined first feature set and the second feature set are processed for subsequent identification of one or more redundant features that may be present in the first feature set and the second feature set. The redundant features (also referred to as outliers) may include, but are not limited to, monolithic service features present in the monolithic service source code that are not required for conversion to micro-services architecture. The redundant features are subsequently removed from the combined feature sets. For instance, if the combined feature sets comprise 20 monolithic services features and out of the said 20 features only 15 features are to be utilized for conversion to the micro-services, the remaining 5 redundant features are therefore subsequently removed from the combined feature sets. For example, in a monolithic service comprising domain entities (E) as {E: E1, E2, E3, E4, E5, E6, E7, E8, E9}, monolithic service source code changes may occur over a period of time. The current version of the monolith does not have active services that use entities E5 and E7, thereby marking the features representing E5 and E7 as redundant. Therefore, such redundant features are subsequently removed. Further, the redundant features are stored in a redundant feature storage unit.

At step 208, bounded context features for monolithic services are determined. In an embodiment of the present invention, one or more cognitive techniques such as, but not limited to, artificial intelligence techniques are utilized to process and analyze the feature sets for determining relation between various monolithic service features present in the combined first features set and the second feature set. Artificial intelligence techniques utilized may include, but are not limited to, unsupervised clustering algorithms, such as, density based spatial clustering of application with noise (DBSCAN) algorithm or the like. The relation between various monolithic service features is determined in order to cluster the most similar features for creating a particular micro-service. In various embodiments of the present invention, multiple micro-services may be created.

In an exemplary embodiment of the present invention, each feature present in the first and second feature sets are processed as one or more data points in an n-dimensional space such as, but not limited to, Euclidian space or the like. Further, each feature present in the feature sets is representative of one or more components of the monolithic source code. For example, the monolithic source code implemented in banking services may have components such as account types, transaction, payment modes, investment or the like. Further, multi-dimensional density based clusters of the similar features point are automatically created based on the similarity of one or more features with respect to other feature, utilizing DBSCAN algorithm. The density based clusters of similar features are formed by determining associations between various features points. The association between the feature points represents one or more similar features points that may lie in close proximity with respect to each other. For instance, in a three dimensional Euclidian space if x, y and z axes represent services X, Y and Z respectively, such that x=1, y=1 and z=1, it implies alteration of a feature by services X, Y and Z. Then, from the monolithic source code, if the features F1, F2, F3 and F4 are represented in the reference space as (0,1,0), (1,1,0), (1,0,0) and (0,0,1) based on alteration by services X, Y and Z, then similarity of the features F1, F2, F3 and F4 are assessed from their relative position in that reference space. In an exemplary embodiment of the present invention, the DBSCAN algorithm applied for clustering the similar feature points determines the density reachability of one point with respect to other point for forming clusters of similar feature points. For example, a point 'p' is said to be density reachable from a point 'q' if point 'p' is within E distance from point 'q' and point 'q' has sufficient number of points in its neighbors which are within distance ε. Further, density connectivity between feature points is determined in furtherance to determining density reachability in order to form unsupervised clusters of similar feature points. For example, suppose point 'p' and 'q' are considered to be density connected, it is determined if a point 'r' has sufficient number of points in its neighbor and both the points 'p' and 'q' are within E distance of the point 'r'. Further, it is determined if a link exists between points in a chaining manner. For instance, if a point 'q' is a neighbor of 'r', 'r' is a neighbor of 's', 's' is a neighbor of point 't' which is a neighbor of point 'p' implies that 'q' is a neighbor of 'p'. Further, the clusters formed are of arbitrary shapes. In an exemplary embodiment of the present invention, therefore separate bounded context features are detected and produced for similar feature density clusters formed comprising similar feature services. For instance, in a three dimensional Euclidian space if x, y and z axes represents features X, Y and Z where x=1, y=1 and z=1 then it implies that a service function utilizes these features. Further, from the monolithic source code if service entities E1, E2, E3 and E4 are found to be (0,1,0), (1,1,0), (1,0,0) and (0,0,1) based on usage of features X, Y and Z represented in that reference space, then, from their relative position in the reference space it may be inferred that the service entities E1, E2 and E3 belong to the same bounded context. The bounded context features are representative of stable boundaries between different services implemented by the monolithic service source code. The stable boundary between different services implies that the services belonging to the particular bounded context features does not comprise conflicting features, with respect to other service features, present in the bounded context features.

At step 210, the services are identified and classified from bounded context features into atomic micro-services and composite micro-services. In an embodiment of the present invention, the bounded context features are processed for identifying and classifying the services from bounded context features into atomic micro-services and composite micro-services. Firstly, the atomic micro-services are identified from the bounded context services. The atomic micro-services are services relating to domain entity service operations, for example, create operation, read operation, update operation, delete operation (CRUD) or the like. Further, for a given bounded context, entities belonging to that bounded context are selected for atomic micro-services. The stored redundant features are fetched for re-introducing the redundant services. The re-introduction of redundant features provides analysis of all the domain resources for effectively identifying the atomic micro-services. Further, after the identification of atomic micro-services, the composite micro-services are identified from the bounded context services. Therefore, once the atomic services are detected, the monolithic functionalities are revisited to check if any monolithic functionality involves interaction with domain entities belonging to multiple bounded contexts. Subsequent to such detection, functionality is marked as a composite service. The composite micro-services are services that may combine or aggregate multiple external CRUD operational functions and further appends business rules.

At step 212, an open API specification is generated for providing interaction and communication between microservices. The specifications of the atomic micro-services and composite micro-services are generated utilizing open source application programming interface (API) specifications for providing interaction and communication of one micro-service with the other micro-service. Therefore, subsequent to the atomic and composite services identification and formation, corresponding API is generated conforming to OpenAPI Specification from the entity participation of those functionalities. For example, for an atomic service, the create, read, update and delete actions get mapped to HTTP methods POST, GET, PUT and DELETE respectively. Further, for composite services the HTTP method is based on the actions performed by a composite API on the domain entities. If no domain entity gets altered in such interaction then HTTP GET is used, otherwise, POST is used in case of mixed actions. In an embodiment of the present invention, the formed atomic and composite micro-services along with the API specifications are provided to the software architect via a graphical user interface (GUI) for assisting the micro-services formed for determining the efficient domain boundaries or bounded context of services for conversion of monolithic service to micro-services.

Figure 3:
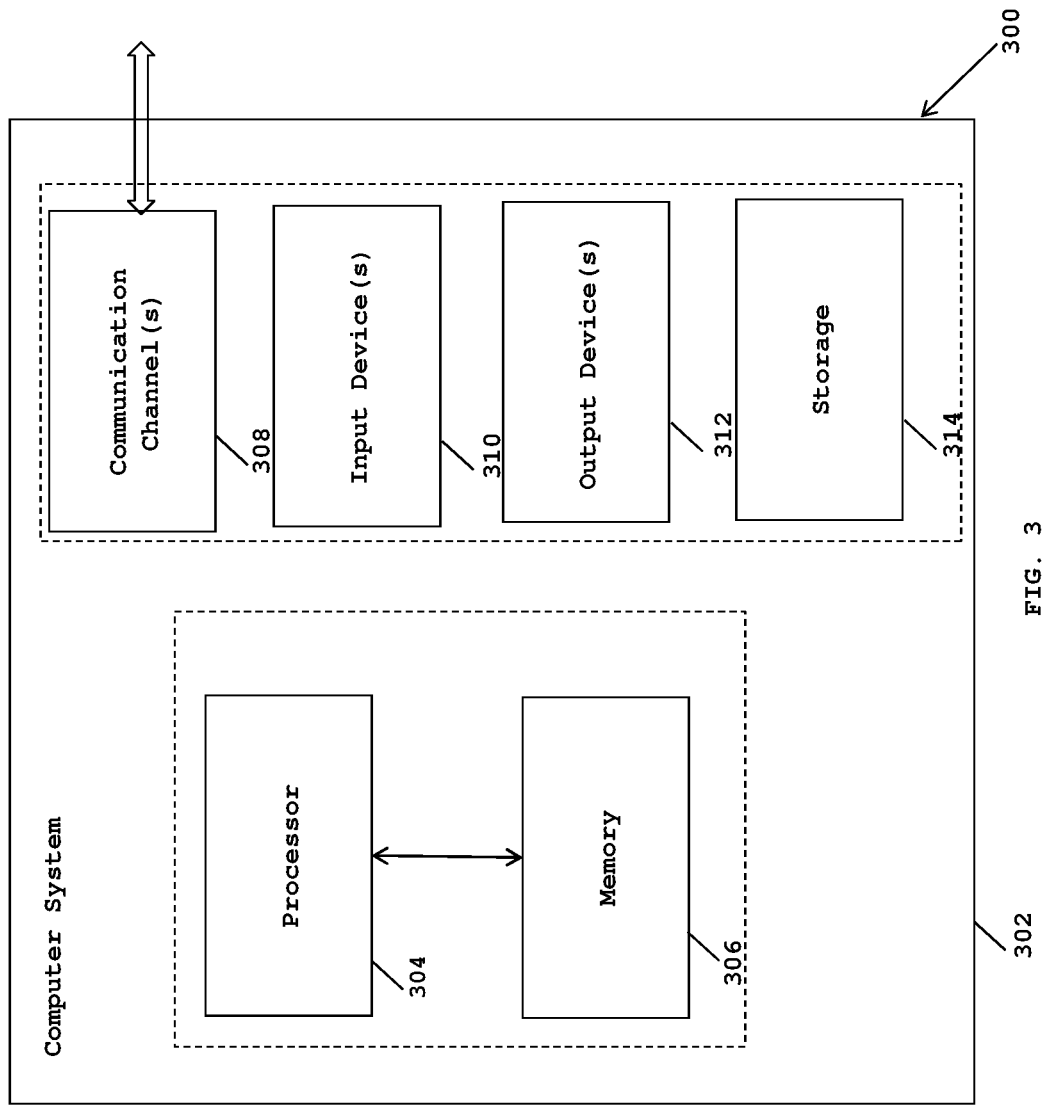
FIG. 3 illustrates an exemplary computer system in which various embodiments of the present invention may be implemented.

FIG. 3 illustrates an exemplary computer system in which various embodiments of the present invention may be implemented. The computer system 302 comprises a processor 304 and a memory 306. The processor 304 executes program instructions and is a real processor. The computer system 302 is not intended to suggest any limitation as to scope of use or functionality of described embodiments. For example, the computer system 302 may include, but not limited to, a programmed microprocessor, a micro-controller, a peripheral integrated circuit element, and other devices or arrangements of devices that are capable of implementing the steps that constitute the method of the present invention. In an embodiment of the present invention, the memory 306 may store software for implementing various embodiments of the present invention. The computer system 302 may have additional components. For example, the computer system 302 includes one or more communication channels 308, one or more input devices 310, one or more output devices 312, and storage 314. An interconnection mechanism (not shown) such as a bus, controller, or network, interconnects the components of the computer system 302. In various embodiments of the present invention, operating system software (not shown) provides an operating environment for various softwares executing in the computer system 302, and manages different functionalities of the components of the computer system 302.

The communication channel(s) 308 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, Bluetooth or other transmission media.

The input device(s) 310 may include, but not limited to, a keyboard, mouse, pen, joystick, trackball, a voice device, a scanning device, touch screen or any another device that is capable of providing input to the computer system 302. In an embodiment of the present invention, the input device(s) 310 may be a sound card or similar device that accepts audio input in analog or digital form. The output device(s) 312 may include, but not limited to, a user interface on CRT or LCD, printer, speaker, CD/DVD writer, or any other device that provides output from the computer system 302.

The storage 314 may include, but not limited to, magnetic disks, magnetic tapes, CD-ROMs, CD-RWs, DVDs, flash drives or any other medium which can be used to store information and can be accessed by the computer system 302. In various embodiments of the present invention, the storage 314 contains program instructions for implementing the described embodiments.

The present invention may suitably be embodied as a computer program product for use with the computer system 302. The method described herein is typically implemented as a computer program product, comprising a set of program instructions which is executed by the computer system 302 or any other similar device. The set of program instructions may be a series of computer readable codes stored on a tangible medium, such as a computer readable storage medium (storage 314), for example, diskette, CD-ROM, ROM, flash drives or hard disk, or transmittable to the computer system 302, via a modem or other interface device, over either a tangible medium, including but not limited to optical or analogue communications channel(s) 308. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the internet or a mobile telephone network. The series of computer readable instructions may embody all or part of the functionality previously described herein.

The present invention may be implemented in numerous ways including as a system, a method, or a computer program product such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention.

We claim:

1. A method for conversion of monolithic services to micro-services, wherein the method is implemented by a processor executing instructions stored in a memory, the method comprising:
    identifying one or more features from a monolithic service source code related to a service associated with a domain in which the monolithic service source code is implemented for creating a first feature set;
    determining one or more features related to dependencies and cross-dependencies amongst one or more service functions associated with the service implemented by the monolithic service source code and between the service functions and entities associated with the domain expressed in the monolithic service source code for creating a second feature set;
    determining a relationship between the features present in the first feature set and the features present in the second feature set for creating a combined feature set, wherein the relationship is representative of similarity of the features present in the first feature set and the second feature set;
    creating separate bounded context features based on the combined feature set having stable boundaries between different services with similar features implemented by the monolithic service source code, the separate bounded context features with stable boundaries between services represent absence of conflicting features between service features present in the bounded context features, wherein the separate bounded context are created by processing the combined feature set as feature data points in an n-dimensional space and automatically creating a multi-dimensional density based cluster having feature data points that are in proximity of each other; and
    creating one or more micro-services based on created separate bounded context features.

2. The method as claimed in claim 1, wherein the service domain features present in the monolithic service source code comprise domain identifiers and domain expressions present in the monolithic service source code, and wherein the identified features are extracted and combined to create the first feature set comprising similar domain features identified from the monolithic service source code.

3. The method as claimed as claim 1, wherein the monolithic service source code is parsed for extracting monolithic source code syntax and an abstract syntax tree (AST) is formed based on the extracted syntax, wherein the AST is representative of the syntax of the source code of the monolithic service in a hierarchical manner and wherein the AST is traversed to determine the dependencies and cross-dependencies amongst the one or more service functions associated with the service.

4. The method as claimed in claim 1, wherein the second feature set is representative of coupling of the service functions implemented by the monolithic service source code to the domain entities which are expressed in the monolithic service source code.

5. The method as claimed in claim 1, wherein redundant features present in the combined feature set are removed, and wherein the redundant features represent monolithic service features present in the monolithic service source code that are not required for conversion to the micro-services.

6. The method as claimed in claim 1, wherein the similar features present in the first feature set and the second feature set are grouped into one or more clusters based on the relationship between the features present in the first feature set and the second feature set to create the combined feature set.

7. The method as claimed in claim 1, wherein the combined feature set is processed as the feature data points in the n-dimensional space by:
    determining a data point 'p' corresponding to a feature from the combined feature set to be density reachable with a data point 'q' corresponding to another feature from the combined feature set when the data point 'p' is within a pre-defined distance from the data point 'q', wherein the data point 'p' has a predetermined number of neighboring data points within the pre-defined distance;
    determining the data point 'p' to be density connected with the data point 'q' when a data point 'r' has a pre-determined number of neighboring data points and the data points 'p' and 'q' are within a pre-defined distance of the data point 'r';
    determining if a chain link exists between the data points 'p' and 'q'; and
    automatically creating the multi-dimensional density based cluster based on the determination, wherein the multi-dimensional density based cluster represents similar features corresponding to the determined data points that are in proximity of each other.

8. The method as claimed in claim 5, wherein the created micro-services comprises one or more atomic micro-services and one or more composite micro-services, and wherein the atomic micro-services are services relating to the domain entity service operations, the atomic micro-services are identified by re-introducing the redundant features, and wherein monolithic functionalities that involve interaction with the domain entities associated with the separate bounded context features are marked as the composite micro-service.

9. The method as claimed in claim 8, wherein the atomic micro-services and the composite micro-services are formed from the services present in the separate bounded context features based on interaction between the services present in the separate bounded context features.

10. The method as claimed in claim 9, wherein one or more application programming interface (API) specifications of the atomic micro-services and the composite micro-services are generated for communication between one micro-service with another micro-service.

11. A system for conversion of monolithic services to micro-services, the system comprising:
    a memory storing program instructions;
    a processor configured to execute program instructions stored in the memory; and
    a service conversion engine executed by the processor and configured to:
    identify one or more features from a monolithic service source code related to a service associated with a domain in which the monolithic service source code is implemented for creating a first feature set;

determine one or more features related to dependencies and cross-dependencies amongst one or more service functions associated with the service, implemented by the monolithic service source code, and between the service functions and entities associated with the domain expressed in the monolithic service source code for creating a second feature set;

determine a relationship between the features present in the first feature set and the features present in the second feature set for creating a combined feature set, wherein the relationship is representative of similarity of the features present in the first feature set and the second feature set;

create separate bounded context features based on the combined feature set having stable boundaries between different services with similar features implemented by the monolithic service source code, the separate bounded context features with stable boundaries between services represent absence of conflicting features between service features present in the bounded context features, wherein the separate bounded context are created by processing the combined feature set as feature data points in an n-dimensional space and automatically creating a multi-dimensional density based cluster having feature data points that are in proximity of each other; and create one or more micro-services based on the created separate bounded context features.

12. The system as claimed in claim 11, wherein the service conversion engine comprises a domain identification unit executed by the processor and configured to extract and combine the features identified from the monolithic service source code for creating the first feature set.

13. The system as claimed in claim 11, wherein the service conversion engine comprises a code parsing unit executed by the processor, wherein the code parsing unit is configured to parse the monolithic service source code by a code parser for extracting source code syntax and forming an abstract syntax tree (AST) based on the extracted syntax, wherein the AST is representative of the syntax of the source code of the monolithic service in a hierarchical manner.

14. The system as claimed in claim 13, wherein the code parsing unit is configured to traverse AST for determining the features related to dependencies and cross-dependencies amongst and between the service functions and the domain entities.

15. The system as claimed in claim 11, wherein the service conversion engine comprises a boundary detection unit executed by the processor and configured to create clusters of similar features present in the first feature set and the second feature set to create the combined feature set based on the relationship between the one or more features present in the first feature set and the second feature set.

16. The system as claimed in claim 15, wherein the boundary detection unit is configured to process the combined feature set as the feature data points in the n-dimensional space by:

determining a data point 'p' corresponding to a feature from the combined feature set to be density reachable with a data point 'q' corresponding to another feature from the combined feature set when the data point 'p' is within a pre-defined distance from the data point 'q', wherein the data point 'p' has a predetermined number of neighboring data points within the pre-defined distance;

determining the data point 'p' to be density connected with the data point 'q' when a data point 'r' has a pre-determined number of neighboring data points and the data points 'p' and 'q' are within a pre-defined distance of the data point 'r';

determining if a chain link exists between the data points 'p' and 'q'; and automatically creating the multi-dimensional density based cluster based on the determination, wherein the multi-dimensional density based cluster represents similar features corresponding to the determined data points that are in proximity of each other.

17. The system as claimed in claim 11, wherein the service conversion engine comprises a service augmentation unit executed by the processor and configured to process the bounded context features for identifying and classifying the services present in the bounded context features into one or more atomic micro-services and one or more composite micro-services.

18. A computer program product comprising:

a non-transitory computer-readable medium having computer program code store thereon, the computer-readable program code comprising instructions that, when executed by a processor, caused the processor to:

identify one or more features from a monolithic service source code related to a service associated with a domain in which a monolithic service source code is implemented for creating a first feature set;

determine one or more features related to dependencies and cross-dependencies amongst one or more service functions associated with the service, implemented by the monolithic service source code, and between the service functions and entities associated with the domain expressed in the monolithic service source code for creating a second feature set;

determine relationship between the features present in the first feature set and the features present in the second feature set for creating a combined feature set, wherein the relationship is representative of similarity of the features present in the first feature set and the second feature set;

create separate bounded context features based on the combined feature set having stable boundaries between different services with similar features implemented by the monolithic service source code, the separate bounded context features with stable boundaries between services represent absence of conflicting features between service features present in the bounded context features, wherein the separate bounded context are created by processing the combined feature set as feature data points in an n-dimensional space and automatically creating a multi-dimensional density based cluster having feature data points that are in proximity of each other; and create one or more micro-services based on the created separate bounded context features.

* * * * *